United States Patent
Lim et al.

(10) Patent No.: US 9,944,315 B2
(45) Date of Patent: Apr. 17, 2018

(54) APPARATUS AND METHOD FOR CONTROLLING STEERING RETURN OF MOTOR DRIVEN POWER STEERING SYSTEM

(71) Applicant: HYUNDAI MOBIS CO., LTD., Seoul (KR)

(72) Inventors: Kyoung Soo Lim, Seoul (KR); Lyoung Tae Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 15/357,910

(22) Filed: Nov. 21, 2016

(65) Prior Publication Data
US 2017/0144697 A1 May 25, 2017

(30) Foreign Application Priority Data
Nov. 20, 2015 (KR) .................... 10-2015-0163117

(51) Int. Cl.
*B62D 5/04* (2006.01)
*B62D 6/00* (2006.01)

(52) U.S. Cl.
CPC ......... *B62D 5/0472* (2013.01); *B62D 5/0466* (2013.01); *B62D 6/008* (2013.01); *B62D 5/0457* (2013.01)

(58) Field of Classification Search
CPC ... B62D 5/0472; B62D 5/0466; B62D 5/0463
USPC ..................................................... 701/41–42
See application file for complete search history.

(56) References Cited

U.S. PATENT DOCUMENTS

| 7,265,509 | B2 * | 9/2007 | Endo ................... | B62D 5/0463 180/443 |
| 9,327,761 | B2 * | 5/2016 | Tsubaki ............... | B62D 5/0463 |
| 9,446,789 | B2 * | 9/2016 | Tsubaki ............. | B62D 15/0285 |
| 2006/0012323 | A1 * | 1/2006 | Endo ................... | B62D 5/0463 318/432 |
| 2008/0114515 | A1 * | 5/2008 | Hara .................... | B62D 5/0466 701/42 |

(Continued)

FOREIGN PATENT DOCUMENTS

| KR | 10-0247334 B1 | 4/2000 | |
| KR | 10-2015-0141932 | * 10/2015 | ........... B62D 5/0463 |

(Continued)

OTHER PUBLICATIONS

Design of control logic and compensation strategy for electric power steering systems; Tsung-Hsien Hu et al.;2008 IEEE Vehicle Power and Propulsion Conference; Year: 2008; pp. 1-6.*

(Continued)

*Primary Examiner* — Cuong H Nguyen
(74) *Attorney, Agent, or Firm* — Knobbe Martens Olson & Bear LLP

(57) ABSTRACT

Enclosed are an apparatus and a method for controlling steering return of a motor driven power steering system. More particularly, various embodiments of the present disclosure relate to an apparatus and method for controlling steering return of a motor driven power steering system, which enables an overshoot-free center stop to be made as well as enables a quick return to be made, when returning after steering by a large steering angle in the motor driven power steering system.

11 Claims, 5 Drawing Sheets

(56) References Cited

U.S. PATENT DOCUMENTS

| | | | |
|---|---|---|---|
| 2008/0228354 A1* | 9/2008 | Kimura | B62D 5/0463 701/42 |
| 2009/0000857 A1* | 1/2009 | Sugiyama | B62D 5/0463 180/444 |
| 2011/0018487 A1* | 1/2011 | Nagase | B62D 5/0463 318/800 |
| 2011/0276229 A1* | 11/2011 | Sugawara | B62D 5/0463 701/42 |
| 2011/0282551 A1* | 11/2011 | Sasaki | B62D 5/0463 701/42 |
| 2015/0191200 A1* | 7/2015 | Tsubaki | B62D 15/0285 701/42 |
| 2016/0059884 A1* | 3/2016 | Gu | B62D 5/0463 701/41 |
| 2016/0318546 A1* | 11/2016 | Lee | B62D 5/0466 |
| 2017/0144697 A1* | 5/2017 | Lim | B62D 5/0466 |
| 2017/0240201 A1* | 8/2017 | Kim | B62D 3/12 |

FOREIGN PATENT DOCUMENTS

| | | | |
|---|---|---|---|
| KR | 10-2015-0163117 | * 10/2015 | B62D 5/0466 |
| KR | 10-2016-0020490 | * 10/2016 | B62D 3/12 |

OTHER PUBLICATIONS

Electric power steering with Permanent magnet synchronous motor drive used in automotive application; R. G. Shriwastava et al.; 2011 1st International Conference on Electrical Energy Systems; Year 2011; pp. 145-148; IEEE Conferece Publications.*

Development of a Test Bench for Tuning and Validating Electric Power Steering Control Method; Chih-Jung Yeh et al.; 2007 IEEE Vehicle Power and Propulsion Conference; Year: 2007; pp. 618-622; IEEE Conference Publications.*

* cited by examiner

APPARATUS AND METHOD FOR CONTROLLING STEERING RETURN OF MOTOR DRIVEN POWER STEERING SYSTEM

CROSS-REFERENCE TO RELATED APPLICATION

The present application claims priority under 35 U.S.C 119(a) to Korean Application No. 10-2015-0163117, filed on Nov. 20, 2015, which is herein incorporated by reference in its entirety.

BACKGROUND

1. Technical Field

Various embodiments of the present disclosure relate to an apparatus and method for controlling steering return of a motor driven power steering system, and more particularly, to an apparatus and method for controlling steering return of a motor driven power steering system, which enables an overshoot-free center stop to be made as well as enables a quick return to be made, when returning after steering by a large steering angle in the motor driven power steering system.

2. Related Art

In general, a motor driven power steering system (MDPS) enables a handling to be light by providing an auxiliary torque in a driver's steering direction using an electrical motor.

The motor driven power steering system automatically controls an operation of the electrical motor according to a driving condition of a vehicle to improve a steering performance and a sense of steering, unlike the conventional hydraulic power steering system (HPS). At this time, the motor driven power steering system includes a torque sensor for measuring a driver's steering torque inputted to a steering wheel, a steering angle sensor for measuring a steering angle of the steering wheel, and a vehicle speed sensor for measuring a vehicle speed, and determines a driving condition of the vehicle.

Meanwhile, when the driver turns the vehicle after adding a steering input, if the driver determines that the turns of the vehicle are done to some extent, the driver slowly releasing the hands from the steering wheel, but the steering wheel returns to the center by a returning act.

The returning act of the steering wheel is generated by a self-alignment torque of tires of the vehicle, and generally, is useful function when the vehicle turns in a speed of 5 km/h~30 km/h.

However, the self-alignment torque given to the steering wheel becomes not sufficient to return the steering wheel to the center, as a residual steering angle is remained due to an act of a frictional force of the system. Thus, in order to fully return the steering wheel to the center, a function to assist the returning act should be separately given.

Accordingly, the motor driven power steering system applies a returning torque that is calculated on the basis of the steering angle to assist the returning act of the steering wheel and to improve the returning performance.

In the motor driven power steering system, when providing the returning force and a damping force to the steering wheel, the damping force is a function for a vehicle speed, and calculated on the basis of a column torque and column speed.

However, when returning the steering wheel, if the damping force is controlled to have an excellent returning performance, an overshoot occurs at a center portion of the steering wheel, and if the damping force is controlled to reduce the occurrence of the overshoot, a returning speed is reduced.

The related art of the present disclosure is disclosed in Korean Patent Registration No. 10-0247334 registered on Dec. 10, 1999 and entitled "Electric power-assisted steering".

SUMMARY

Various embodiments are directed to an apparatus and method for controlling steering return of a motor driven power steering system, which enables an overshoot-free center stop to be made as well as enables a quick return to be made, when returning after steering by a large steering angle.

According to an aspect of the present disclosure, an apparatus for controlling steering return of a motor driven power steering system may include a column torque sensor for measuring a column torque of a steering wheel to identify a driver's steering torque inputted to the steering wheel; a steering angle sensor for measuring a steering angle of the steering wheel; a column speed calculator for calculating a column speed for rotating a steering column on the basis of the steering angle; a vehicle speed sensor for sensing a vehicle speed of a vehicle; and a damping force calculator for receiving the column torque, the steering angle, the column speed, and the vehicle speed from the column torque sensor, the steering angle sensor, the column speed calculator, and the vehicle speed sensor, calculating a damping force on the basis of the column torque and the column speed according to the vehicle speed, determining a damping compensation condition, and applying a damping compensation value and an instantaneous damping force to the damping force to output the damping force.

The damping force calculator may include a damping compensator for calculating the damping compensation value according to the damping compensation condition on the basis of the column torque and the column speed, and calculating the instantaneous damping force on the basis of the steering angle.

The damping compensation condition may include a condition in which the vehicle speed is a setting vehicle speed or more, the column speed is a setting speed or more, and the column torque is a setting torque or less when restoring the steering wheel.

The instantaneous damping force may apply a steering gain to a setting value or more.

The damping force calculator may apply the instantaneous damping force when the steering angle may be in an on-center region.

A range of the on-center region may be variably set according to the vehicle speed.

A method for controlling steering return of a motor driven power steering system according to another aspect of the present disclosure may include receiving, by a damping force calculator, a vehicle speed, a column torque, and a column speed from a vehicle speed sensor, a column torque sensor, a column speed calculator and calculating a damping force on the basis of the column torque and column speed according to the vehicle speed; determining, by the damping force calculator, a damping compensation condition from the vehicle speed, the column torque, and the column speed; calculating, by the damping force calculator, damping compensation value based on the damping compensation condition, and applying the damping compensation value to the calculated damping force to compensate the damping force; receiving, by the damping force calculator, the steering angle from a steering angle sensor, determining whether the steering angle is in an on-center region, and additionally applying an instantaneous damping force; and outputting, by the damping force calculator, the damping force.

In determining the damping compensation condition, the damping force calculator may compare with a condition that a vehicle speed is a setting vehicle speed or greater, the column speed is a setting speed or greater, and the column torque is a setting torque or less, when restoring the steering wheel.

In additionally applying the instantaneous damping force, the steering angle gain may be applied to the setting value or greater.

In in additionally applying the instantaneous damping force, the damping force calculator may apply the instantaneous damping force when the steering angle is in the on-center region.

A range of the on-center region may be variably set according to the vehicle speed.

The apparatus and method for controlling steering return of a motor driven power steering system according to the present disclosure enables an overshoot-free center stop to be made as well as enables a quick restoration to be made, when returning after steering by a large steering angle, and thereby enabling the vehicle to run straightly with quick return and improving stability of the vehicle.

BRIEF DESCRIPTION OF THE DRAWINGS

Various embodiments of an inventive concept will become more apparent in view of the attached drawings and accompanying detailed description, in which.

DETAILED DESCRIPTION OF THE EMBODIMENTS

Embodiments of the present disclosure will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
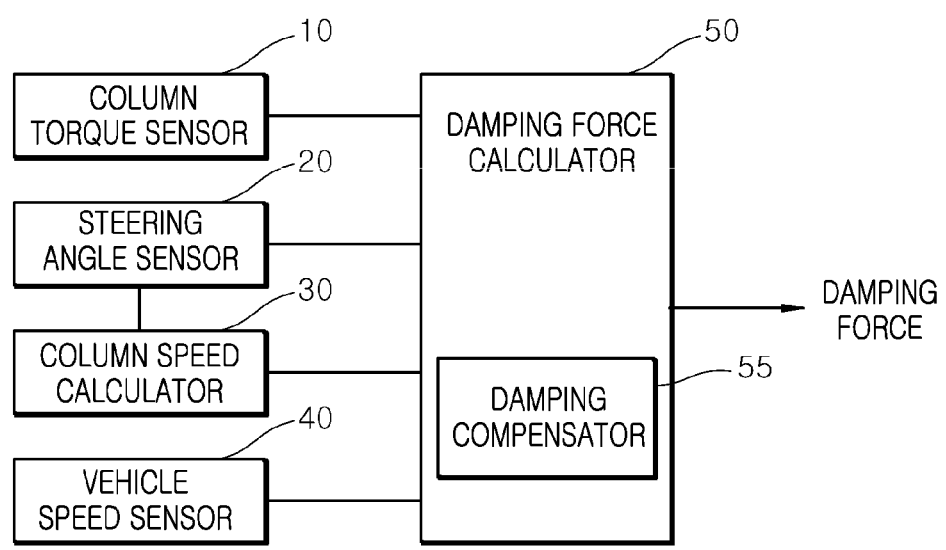
FIG. 1 is a block diagram illustrating a configuration of an apparatus for controlling steering return of a motor driven power steering system according to an embodiment of the present disclosure.
Figure 2:
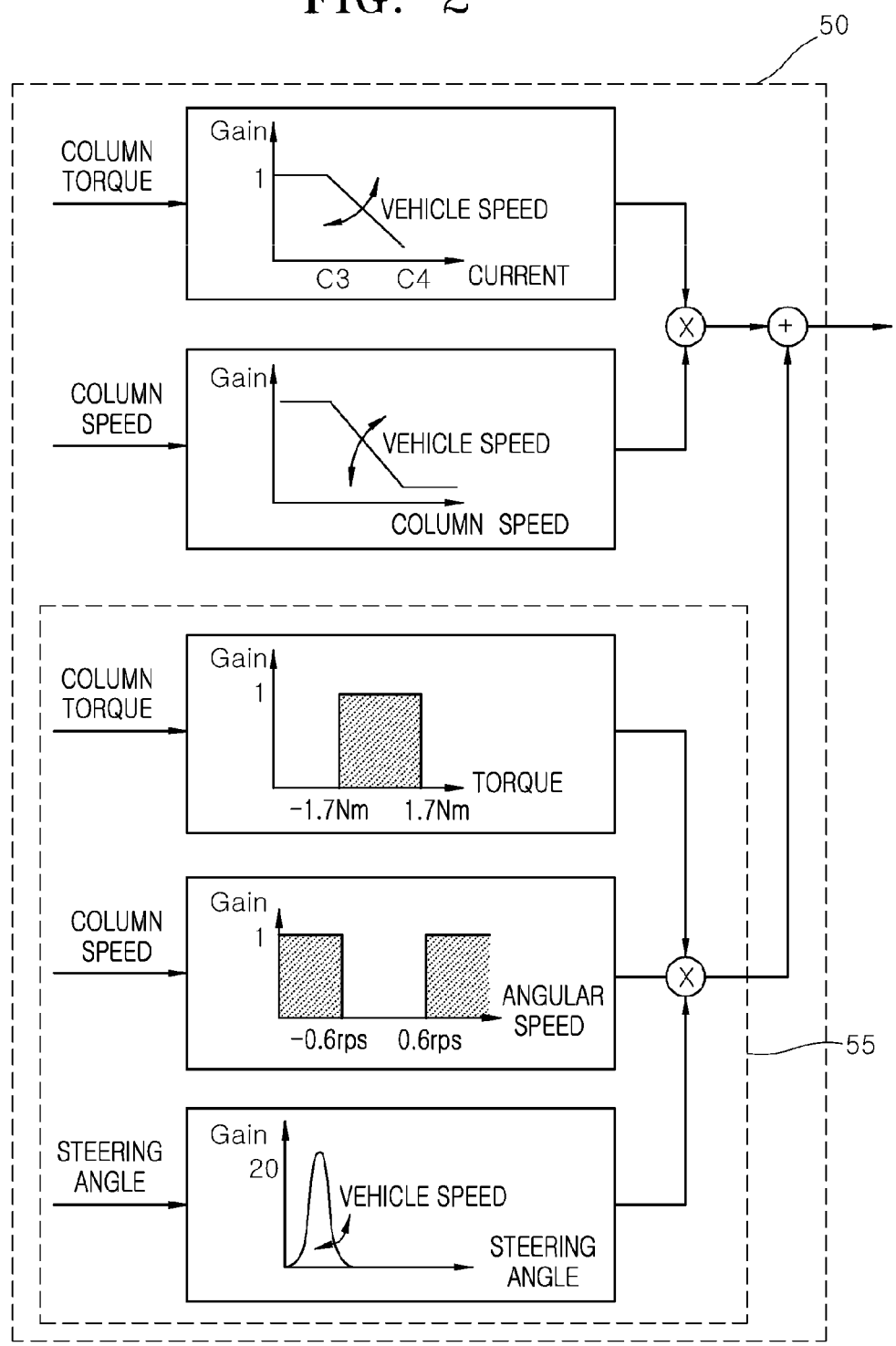
FIG. 2 is a circuit diagram illustrating a logic of a damping force calculator of an apparatus for controlling steering return of a motor driven power steering system according to an embodiment of the present disclosure.
Figure 3:
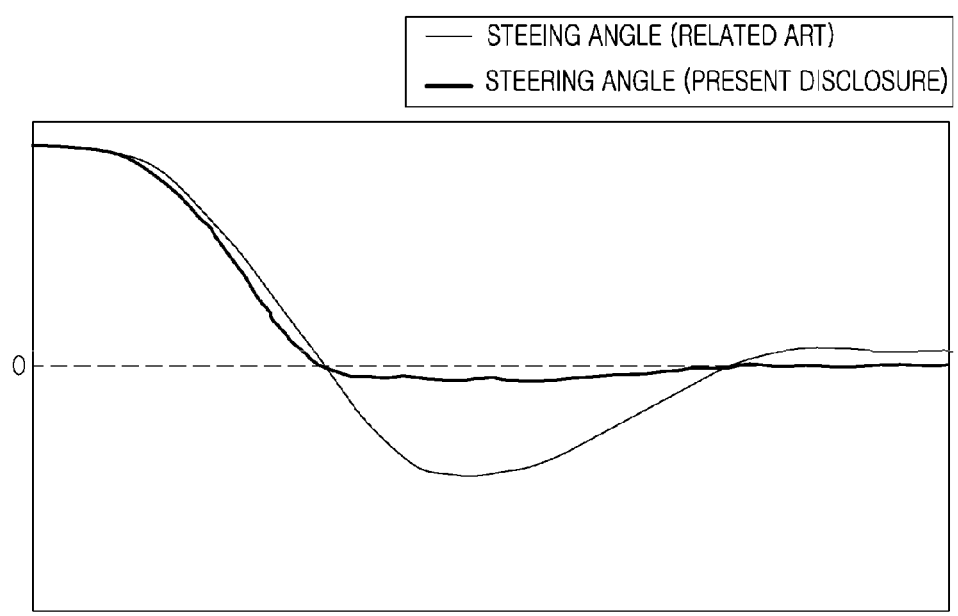
FIG. 3 is a graph illustrating a comparison result of returning performance by an apparatus for controlling steering return of a motor driven power steering system according to an embodiment of the present disclosure.
Figure 4:
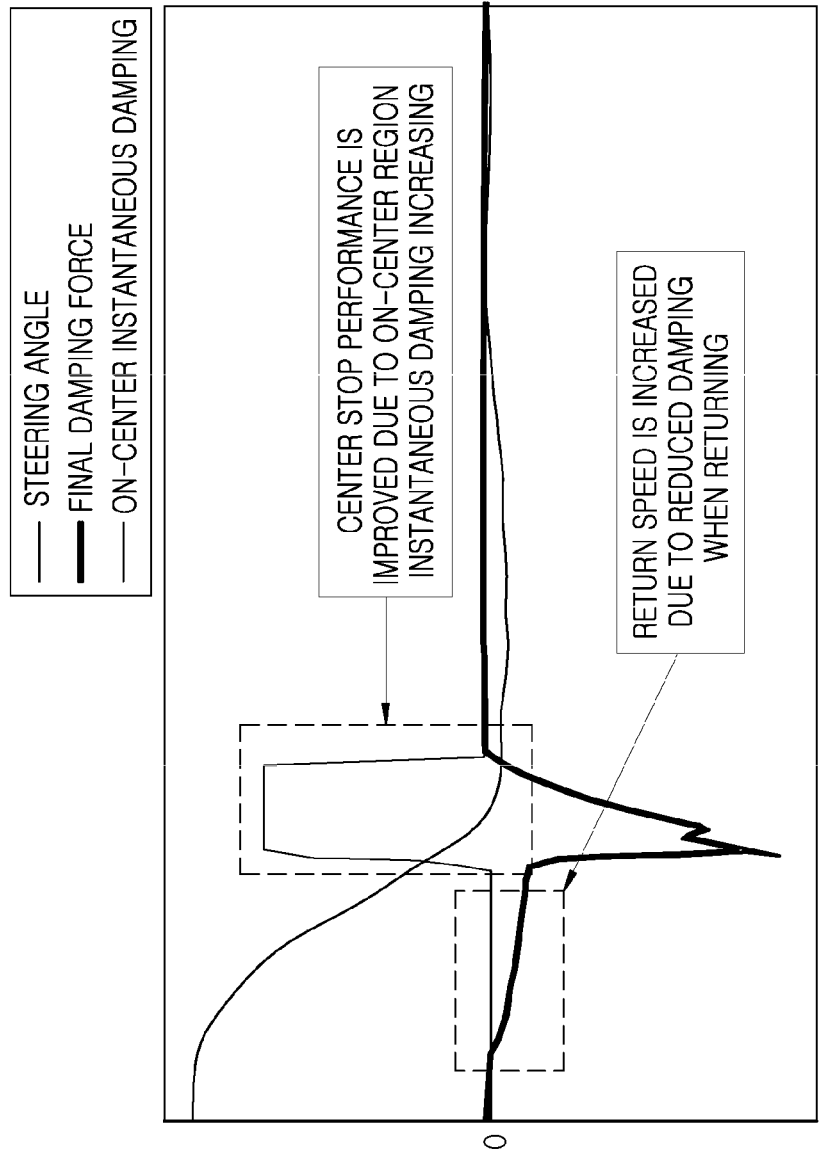
FIG. 4 is a graph illustrating a steering angle and a damping force of an apparatus for controlling steering return of a motor driven power steering system according to an embodiment of the present disclosure.

FIG. 1 is a block diagram illustrating a configuration of an apparatus for controlling steering return of a motor driven power steering system according to an embodiment of the present disclosure, FIG. 2 is a circuit diagram illustrating a logic of a damping force calculator of an apparatus for controlling steering return of a motor driven power steering system according to an embodiment of the present disclosure, FIG. 3 is a graph illustrating a comparison result of returning performance by an apparatus for controlling steering return of a motor driven power steering system according to an embodiment of the present disclosure, and FIG. 4 is a graph illustrating a steering angle and a damping force of an apparatus for controlling steering return of a motor driven power steering system according to an embodiment of the present disclosure.

As illustrated in FIGS. 1 and 2, the apparatus for controlling steering return of a motor driven power steering system according to an embodiment of the present disclosure includes a column torque sensor 10, a steering angle sensor 20, a column speed calculator 30, a vehicle speed sensor 40, and a damping force calculator 50.

The column torque sensor 10 measures and outputs a column torque of a steering wheel (not illustrated) to identify a driver's steering torque inputted to the steering wheel. The steering angle sensor 20 measures and outputs a steering angle of the steering wheel.

The column speed calculator 30 calculates and outputs a column speed of a rotating steering column, that is, an angular speed on the basis of the steering angle. The vehicle speed sensor 40 detects and outputs a vehicle speed of a vehicle.

The damping force calculator 50 receives the column torque, the steering angle, the column speed, and the vehicle speed from the column torque sensor 10, the steering angle sensor 20, the column speed calculator 30, and the vehicle speed sensor 40, calculates a damping force on the basis of the column torque and column speed according to the vehicle speed, determines a damping compensation condition, and outputs the damping force by applying a damping compensation value and an instantaneous damping force.

The damping force calculator 50 may include a damping compensator 55 for calculating the damping compensation value according to the damping compensation condition on the basis of the column torque and column speed, and calculating the instantaneous damping force on the basis of the steering angle.

In the embodiment, the damping compensation condition is a condition of the steering wheel to be released after steering by a large steering angel on driving in a medium or high speed, and may be set, for example, to a condition that the vehicle speed is 80 kph or greater, the column speed is 0.6 rps or less, and the column torque is 1.7 Nm or less.

In other words, when releasing the steering wheel after steering on a normal driving, the column torque is generated 2.0 Nm or greater when the column speed is 0.5 rps or greater. Also, in a condition of releasing after steering by a large steering angle, the column torque is rapidly reduced to 1.6 Nm or less, and the column speed is rapidly increased to 0.6 rps or greater.

In the embodiment, the condition is set to a medium and high speed driving so as to be distinguished from a normal driving, and the column speed is set to 0.6 rps or greater, and the column torque is set to 1.7 Nm or less. The set value can be applied differently according to the vehicle, and is preferred to be optimized and set according to a corresponding vehicle.

Accordingly, in case of right wheel (RH) steering, when the column torque is 1.7 Nm or less, and the column speed is −0.6 rps or less, it can be determined as a damping compensation condition, and in case of left wheel (LH) steering, when the column torque is −1.7 Nm or greater, and the column speed is 0.6 rps or greater, it can be determined as a damping compensation condition.

As such, the damping force calculator 50 can improve a returning speed by applying the damping compensation value in the damping condition. In addition, when the steering angle is in an on-center region, the damping force calculator 50 can prevent the overshoot in the on-center region by applying a steering angle gain to a predetermined value or greater, for example, 20 or greater as the instantaneous damping force. At this time, the range of the on-center region may be variably set according to the vehicle speed.

As such, in case that the damping force calculator 50 additionally applies the damping compensation value and instantaneous damping force according to the compensation condition, when comparing the returning performance of the steering angle of the related art with the steering angle of the present disclosure, as illustrated in the graph of the steering angle in FIG. 3, it can be seen that the overshoot at the center region has been improved as well as the initial return speed has been improved.

In addition, as illustrated in the graph of FIG. 4, it can be seen that the return speed is increased as the final damping force is decreased at the time of return, and the steering wheel is center-stopped without overshoot by additionally applying the instantaneous damping force in the on-center region.

Here, the graphs illustrated in FIGS. 3 and 4 are graphs showing a result of evaluating a return performance in a state of releasing after 90 degrees steering in a vehicle speed of 80 kph.

As described above, according to an embodiment of the present disclosure, the apparatus for controlling steering return of a motor driven power steering system allows a quick return when returning after steering by a large steering angle on driving in the motor driven power steering system, and allows an overshoot-free center-stop to be made, thereby enabling the vehicle to be straightly driven and improving the stability of the vehicle.

Figure 5:
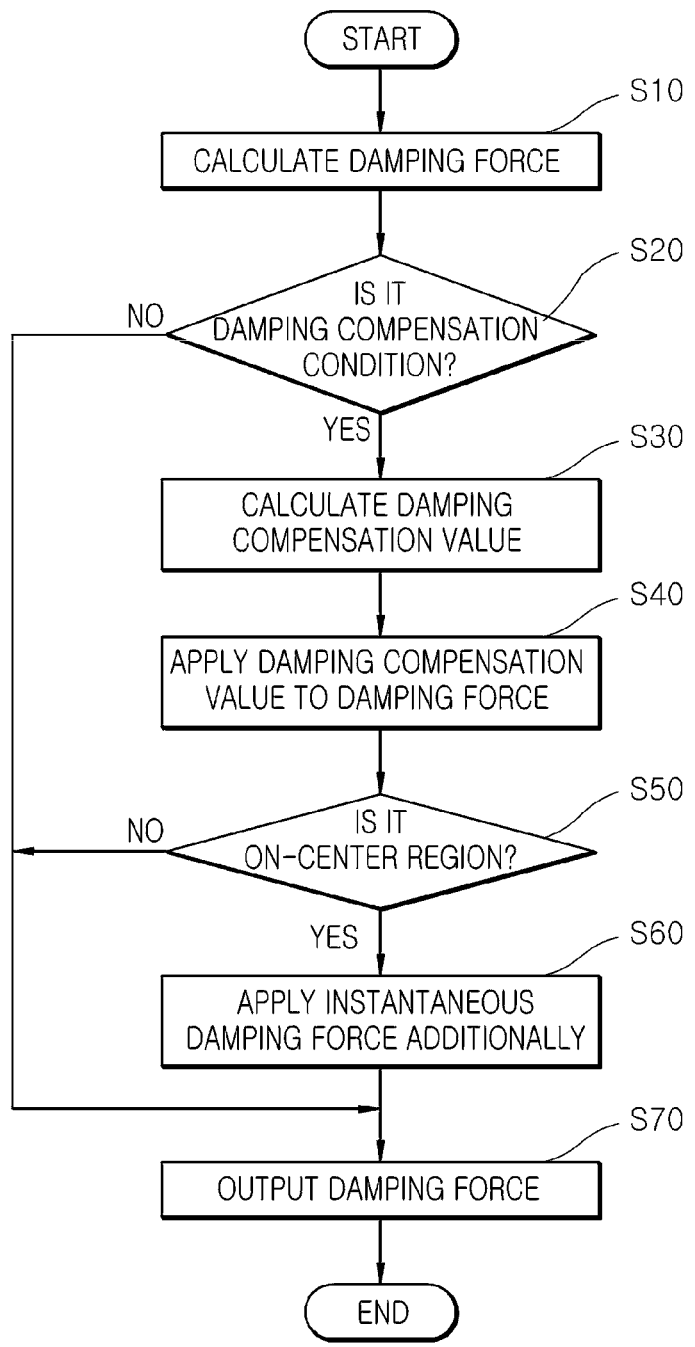
FIG. 5 is a flow chart illustrating a method for controlling steering return of a motor driven power steering system according to an embodiment of the present disclosure.

FIG. 5 is a flow chart illustrating a method for controlling steering return of the motor driven power steering system according to an embodiment of the present disclosure.

As illustrated in FIG. 5, in the method for controlling steering return of a motor driven power steering system according to an embodiment of the present disclosure, firstly, the damping calculator 50 receives the column torque, the column speed, and the vehicle speed from the column torque sensor 10, the column speed calculator 30, and the vehicle speed sensor 40, and calculates the damping force on the basis of the column torque and column speed according to the vehicle speed (S10).

In operation S10, the damping calculator 50 receives the column torque, the column speed and the vehicle speed from the column torque sensor 10, the column speed calculator 30, and the vehicle speed sensor 40, determines a damping compensation condition, and outputs the damping force by applying a damping compensation value and an instantaneous damping force, while calculating the damping force (S20).

In the embodiment, the damping compensation condition is a condition of the steering wheel to be released from the steering after steering by a large steering angle on driving in a medium and high speed of the vehicle, and the damping compensation condition may be set to a condition, for example, the vehicle speed is 80 kph or greater, the column speed is 0.6 rps or less, and the column torque is 1.7 Nm or less.

In other words, in case of the column speed and column torque returned when releasing after steering on a normal driving, the column torque is generated 2.0 Nm or greater when the column speed is 0.5 rps or greater, and in case of the column speed and column torque returned when releasing after steering by a large steering angle, the column torque is rapidly decreased to 1.6 Nm or less, and the column speed is rapidly accelerated to 0.6 rps or greater.

In the embodiment, the condition is set to a medium and high speed driving so as to be distinguished from a normal driving, the column speed is set to 0.6 rps or greater, and the column torque is set to 1.7 Nm or less. The set value can be applied differently according to the vehicle, and is preferred to be optimized and set according to the corresponding vehicle.

Accordingly, in case of right wheel (RH) steering, when the column torque is 1.7 Nm or less, and the column speed is −0.6 rps or less, it can be determined as a damping compensation condition, and in case of left wheel (LH) steering, when the column torque is −1.7 Nm or greater, and the column speed is 0.6 rps or greater, it can be determined as a damping compensation condition.

If it is not the damping condition in operation S20, the damping force calculator 50 outputs a damping force calculated without applying the damping compensation value (S70).

On the other hand, it is determined as a damping compensation condition, the damping force calculator 50 calculates the damping compensation value (S30).

If the damping compensation value is calculated in operation S30, the damping force calculator 50 applies the damping compensation value to the calculated damping force (S40).

Then, the damping force calculator 50 receives a returned steering angle from the steering angle sensor 20, and determines whether the steering angle is included in the on-center region (S50). Here, a range of the on-center region may be variably set according to the vehicle speed.

If the steering angle is not included in the on-center region in operation S50, the damping force calculator 50 outputs the damping force that is applied in operation S40 (S70).

However, if the steering angle is included in the on-center region in operation S50, the damping force calculator 50 calculates an instantaneous damping force and additionally applies the calculated instantaneous damping force to the calculated damping force (S60).

Here, in applying the instantaneous damping force, a steering angle gain is set to a setting value or greater, for example, the steering angle gain may be applied as 20 or greater to prevent an overshoot of the on-center region.

Then, the damping force calculator 50 outputs the damping force (S70).

As such, the damping force calculator 50 can improve the returning speed by applying the damping compensation value in the damping condition. In addition, when the steering angle is in the on-center region, the damping force calculator 50 can prevent the overshoot and improve the center-stop performance by additionally applying the instantaneous damping force in the on-center region.

As described according to an embodiment of the present disclosure, the apparatus and method for controlling steering return of a motor driven power steering system allows a quick return when returning after steering by a large steering angle on driving in the motor driven power steering system, and allows an overshoot-free center-stop to be made, thereby enabling the vehicle to be straightly driven and improving the stability of the vehicle.

The embodiments of the inventive concept have been disclosed above for illustrative purposes. Those of ordinary skill in the art will appreciate that various modifications, additions and substitutions are possible, without departing from the scope and spirit of the inventive concept as disclosed in the accompanying claims.

What is claimed is:

1. An apparatus for controlling steering return of a motor driven power steering system, comprising:
   a column torque sensor for measuring a column torque of a steering wheel to identify a driver's steering torque inputted to the steering wheel;
   a steering angle sensor for measuring a steering angle of the steering wheel;
   a column speed calculator for calculating a column speed for rotating a steering column on the basis of the steering angle;
   a vehicle speed sensor for sensing a vehicle speed of a vehicle; and
   a damping force calculator for receiving the column torque, the steering angle, the column speed, and the vehicle speed from the column torque sensor, the steering angle sensor, the column speed calculator, and the vehicle speed sensor, respectively, calculating a damping force on the basis of the column torque and column speed according to the vehicle speed, determining a damping compensation condition, and applying a damping compensation value and an instantaneous damping force to the damping force to output the damping force.

2. The apparatus of claim 1, wherein the damping force calculator comprises a damping compensator for calculating the damping compensation value according to the damping compensation condition on the basis of the column torque and column speed, and calculating the instantaneous damping force on the basis of the steering angle.

3. The apparatus of claim 1, wherein the damping compensation condition includes a condition in which the vehicle speed is a setting vehicle speed or greater, the column speed is a setting speed or greater, and the column torque is a setting torque or less when returning the steering wheel.

4. The apparatus of claim 1, wherein in applying the instantaneous damping force, a steering angle gain is set to a setting value or greater.

5. The apparatus of claim 1, wherein the damping force calculator applies the instantaneous damping force when the steering angle is in an on-center region.

6. The apparatus of claim 5, wherein a range of the on-center region is variably set according to the vehicle speed.

7. A method for controlling steering return of a motor driven power steering system, comprising:
   receiving, by a damping force calculator, a vehicle speed, a column torque, and a column speed from a vehicle speed sensor, a column torque sensor, and a column speed calculator, respectively, and calculating a damping force on the basis of the column torque and column speed according to the vehicle speed;
   determining, by the damping force calculator, a damping compensation condition from the vehicle speed, the column torque, and the column speed;
   calculating, by the damping force calculator, damping compensation value based on the damping compensation condition, and applying the damping compensation value to the calculated damping force to compensate the damping force;
   receiving, by the damping force calculator, a steering angle from a steering angle sensor, determining whether the steering angle is in an on-center region, and additionally applying an instantaneous damping force; and
   outputting, by the damping force calculator, the damping force.

8. The method of claim 7, wherein in determining the damping compensation condition, the damping force calculator compares with a condition that a vehicle speed is a setting vehicle speed or greater, the column speed is a setting speed or greater, and the column torque is a setting torque or less, when restoring the steering wheel.

9. The method of claim 7, wherein in additionally applying the instantaneous damping force, the steering angle gain is applied to a setting value or greater.

10. The method of claim 7, wherein in additionally applying the instantaneous damping force, the damping force calculator applies the instantaneous damping force when the steering angle is in the on-center region.

11. The method of claim 10, wherein a range of the on-center region is variably set according to the vehicle speed.

* * * * *